March 23, 1965  R. L. NOFFSINGER  3,174,617
BAR-TYPE CONVEYING CHAIN
Filed July 28, 1961
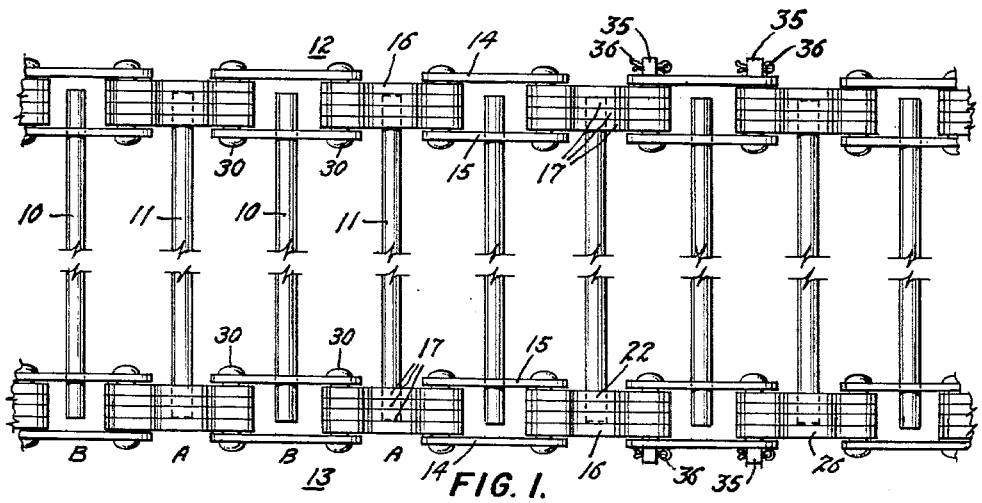
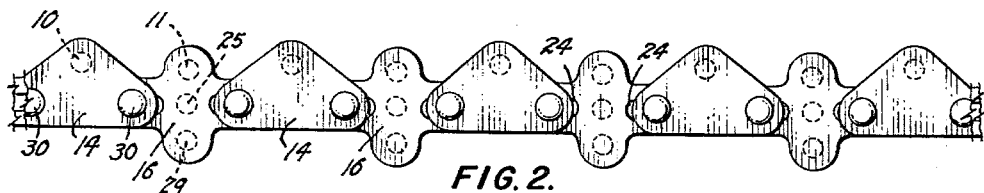
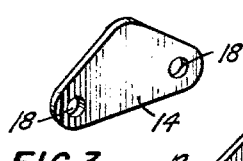
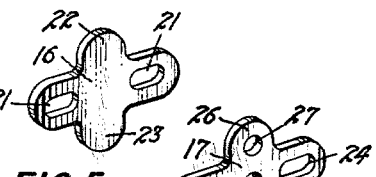
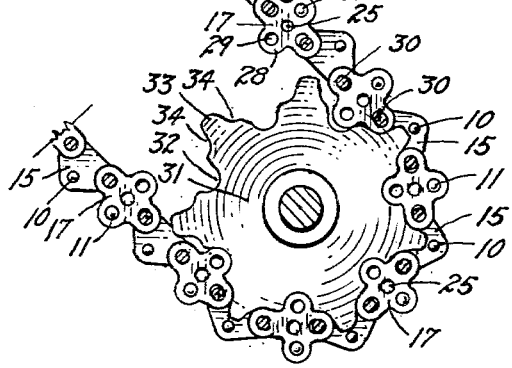
INVENTOR.
RALPH L. NOFFSINGER
BY
ATTORNEY

United States Patent Office 3,174,617
Patented Mar. 23, 1965

3,174,617
BAR-TYPE CONVEYING CHAIN
Ralph L. Noffsinger, 1833 Pinecrest Lane, Greeley, Colo.
Filed July 28, 1961, Ser. No. 127,528
1 Claim. (Cl. 198—195)

This invention relates to a bar or rod chain of the type employed on agricultural implements and more particularly of the type employed in potato harvesters for digging, declodding, elevating and conveying potatoes and the other root crops.

The usual potato digger chain comprises a plurality of rods, each rod being bent at its extremities to hook over an adjacent rod to provide a continuous endless plurality of spaced-apart, parallel rods. Such a chain is subject to extreme wear at the points where the adjacent rods hook over and engage each other. The wear is increased by the sand and grit of the soil in which such a chain operates so that soon the rods are cut through at the points beneath the hooked over extremities so that the entire chain, rods and all, must be discarded due to wear at this single point.

The principal object of this invention is to provide a rod chain consisting of simple straight rods which will not be subject to any interlinkage wear and which will be supported in parallel relation by endless side, carrying chains at the extremities of the rods so that all operational wear will occur in the side chains making it unnecessary to discard and replace the rods in the event of wear.

Another object of the invention is to provide carrying chains for the rods which can be economically assembled from simple stamped members so designed that the rods can be inserted in any desired arrangement to provide either a straight flat chain or a chain with raised or lowered offsets or gains to provide any desired load engaging means.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a fragmentary top view of the improved rod chain with the midsection broken away to show indeterminate width;

FIG. 2 is a side view thereof;

FIGS. 3, 4, 5 and 6 are detail perspective views showing four types of stamped plates employed in the improved chain to be later described; and FIG. 7 is a fragmentary, reduced scale, detail view showing the chain with the rear side plates cut away as it would appear passing about a sprocket.

The improved rod chain comprises a plurality of straight, parallel rods 10 and 11 of any desired length depending upon the particular installation. The extremities of the rods 10 and 11 are removably inserted in endless side carrying chains each designated in its entirety by the numerals 12 and 13. The side chains 12 and 13 are assembled from four different types of flat, stamped metallic blanks designated herein by numeral as follows: imperforate, open link, side plate 14 (FIG. 3), perforated, open link, side plate 15 (FIG. 4), imperforate closed-link, plate 16 (FIG. 5), and perforated closed-link plate 17 (FIG. 6). The open link side plates are similar in size and shape.

The side plates 14 and 15 are similar in size and both have a similar, generally isosceles, triangular shape. The imperforate side plate 14 is provided with two spaced rivet holes 18 and the perforated side plate 15 is provided with similarly spaced rivet holes 19 and with a rod hole 20 positioned adjacent the apex of the triangle. The imperforate closed-link plate 16 has rounded extremities provided with elongated rivet holes 21 and with an upwardly extending tab 22 and a downwardly extending tab 23. The perforated closed-link plate 17 corresponds in size and shape to the plate 16 and is provided with two rivet holes 24 corresponding in position to the rivet holes 21 and with a central rod hole 25. The upper tab on the perforated closed-link plate 17, indicated at 26, contains an upper rod hole 27 and the lower tab thereon, indicated by the numeral 28, contains a lower rod hole 29.

The rivet holes in each plate are spaced apart to correspond to the pitch of the particular chain and the rod hole 25 is positioned in the plane of the rivet holes 18 and the rod holes 20 and 27 are positioned above and the rod hole 29 is positioned below the latter plane.

The plates 14 and 15, 16 and 17 are assembled, as shown in FIG. 1, to form the two endless flexible chains 11 and 12. The assembling is accomplished by placing a plurality of the perforated closed-link plates 17 against one of the imperforate plates 16 to form solid links, as indicated at A, thence connecting the solid links together by means of open links B, each consisting of a perforated side plate 14 and an imperforate side plate 15. The open links B and the closed links A are pivotally connected together by means of suitable rivets 30 which pass through the rivet holes 18 of the plates 14, thence through the rivet holes 21 of the plate 16, thence through the rivet holes 24 of the plates 17, and thence through the rivet holes 19 of the plates 15. The extremities of the rods 10 are inserted through the rod holes 20 of the inside side plates 15 terminating against the imperforate outside side plates 14. The extremities of the rods 11 are inserted through any desired ones of the rod holes 25, 27 and 29 of the plates 17 and terminate against the plates 16 or the tabs 22 or 23 of the latter plates.

If it is desired to have all of the rods travel in the same plane, the rods 11 are inserted through the rod holes 27 to align them with the rods 10 in the rod holes 20. If it is desired to have certain of the rods 11 positioned below the plane of the rods 10 to form what is known as downwardly extending "gains" in the chain for greater elevating effect, rods 11 are then inserted in either the rod holes 25 or the rod holes 29 depending upon the depth of gain desired.

Due to the fact that the plates forming the side chains 12 and 13 are stamped and not accurately machined and also due to the fact that wear in the rivet holes will vary the total length of the chain, the rivet holes 21 and 24 in the plates 16 and 17 are slightly elongated so that as the links pass over sprockets, the links B can be forced toward the links A to the accurate pitch of the chain.

In FIG. 7, a sprocket for this purpose is illustrated at 31. In this figure, the chain is shown with the near imperforate open link side plates 14 removed to show how the closed link plates 16 and 17 fit to the sprocket. The sprocket contains an annular series of arcuate notches 32 for receiving the lower tabs 23 and 28 of the solid links. A tooth 33 projects radially outward from between each pair of adjacent notches 32 to enter between the plates 14 and 15 of each open link B. The teeth 33 are provided with shoulders or lands 34 for receiving the rounded extremities of the links 16 and 17.

It will be noted from the above that the tension in the side chains imparts no wear to the rods 10 and 11 nor do the rods come in contact with the sprockets. Therefore, there is nothing to wear away the rods as in the conventional chain. The only wear occurs on the easily replacable rivets 30. For assembling purposes, an open link B of the side carrying chains can be provided with withdrawable rivets 35 held in place in any detachable manner such as by means of suitable cotter keys 36.

While a specific form of the improvement has been described and illustrated herein, it is to be understood that the same may be varied within the scope of the appended claim, without departing from the spirit of the invention.

Having thus described the invention what is claimed and desired to be secured by Letters Patent is:

A conveying chain comprising: a plurality of straight, cylindrical, parallel rods of uniform length removably inserted at their extremities into side chains, said side chains comprising open links, alternating with and riveted to closed links, said closed links including a plurality of similar closed-link spacing plates having rounded extremities provided with rivet holes; an upwardly extending, medially positioned tab formed on said spacing plates; a downwardly extending tab positioned opposite said upwardly extending tab, each of said tabs being provided with a rod opening, there being a third rod opening in the center of said plates between the rivet holes and the rod openings; and an imperforate closed-link outer plate similar in size and shape to said closed link spacing plates, having no rod openings and positioned on the outside of said closed-link spacing plates to close the rod openings in said spacing plates, said open links including an inner isosceles triangular side plate having a rivet hole adjacent each extremity and a rod hole positioned adjacent the apex of the triangle and an outer side plate similar in size and shape to said inner side plate having no rod opening therein, rivets extending through the rivet holes in the plates of both links and securing the inner side plates and the outer side plates of said open links to the two sides of said closed links, said parallel rods extending between said chains with their extremites inserted in selected rod openings in the closed-links, and in the rod openings adjacent the apex of the triangle of said open links, the imperforate plates of the closed-links and the outer side plate of the open-links limiting endwise movement of said rods.

References Cited by the Examiner

UNITED STATES PATENTS

| | | | |
|---|---|---|---|
| 848,236 | 3/07 | Ginaca | 198—195 |
| 2,071,325 | 2/37 | Bateman et al. | 198—195 |
| 2,575,610 | 11/51 | Ball | 198—175 |
| 2,667,262 | 1/54 | Davis | 198—198 |

FOREIGN PATENTS

| | | |
|---|---|---|
| 8,830 | 6/87 | Great Britain. |
| 542,971 | 12/55 | Belgium. |

SAMUEL F. COLEMAN, *Primary Examiner.*

JULIUS E. WEST, ERNEST A. FALLER, JR.,
*Examiners.*